W. N. Whiteley Jr.
Mower.

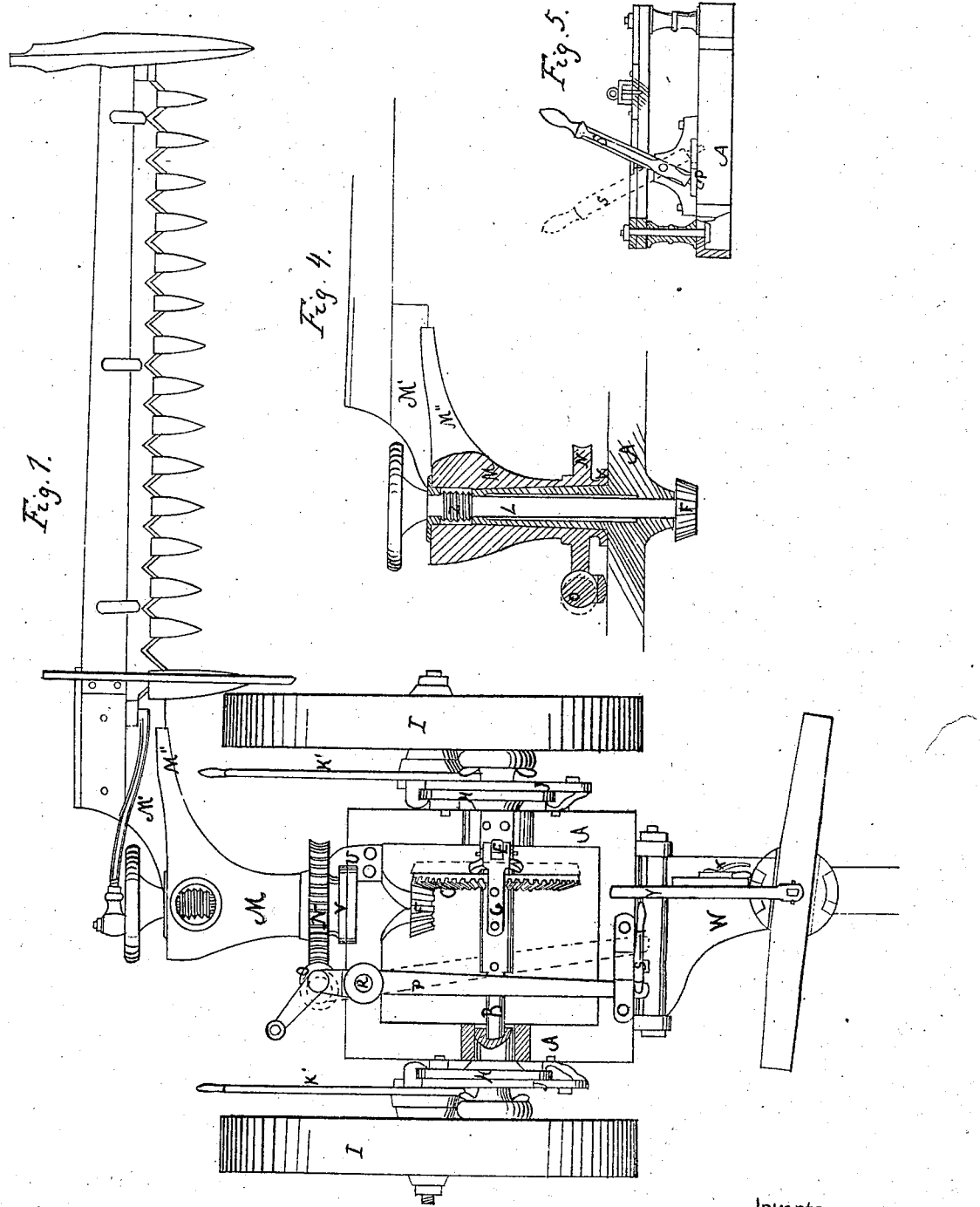

Nº 64818    Patented May 14, 1867.

UNITED STATES PATENT OFFICE.

WILLIAM N. WHITELEY, JR., OF SPRINGFIELD, OHIO.

IMPROVEMENT IN HARVESTERS.

Specification forming part of Letters Patent No. 64,818, dated May 14, 1867.

*To all whom it may concern:*

Be it known that I, WILLIAM N. WHITELEY, Jr., of Springfield, in the county of Clark and State of Ohio, have invented a new and useful Improvement in Harvesters; and I do hereby declare the following to be a full, clear, and exact description of the same, reference being had to the accompanying drawing, in which—

Figure 3:
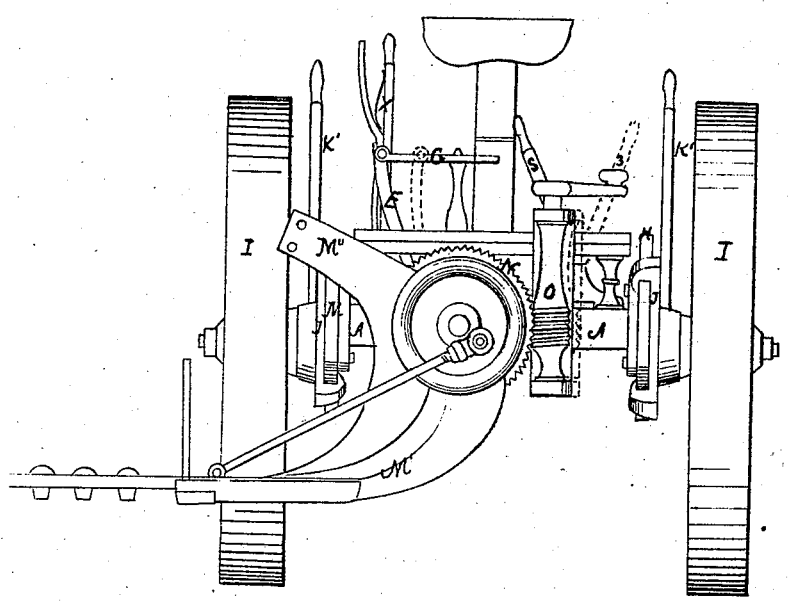
Figure 2:
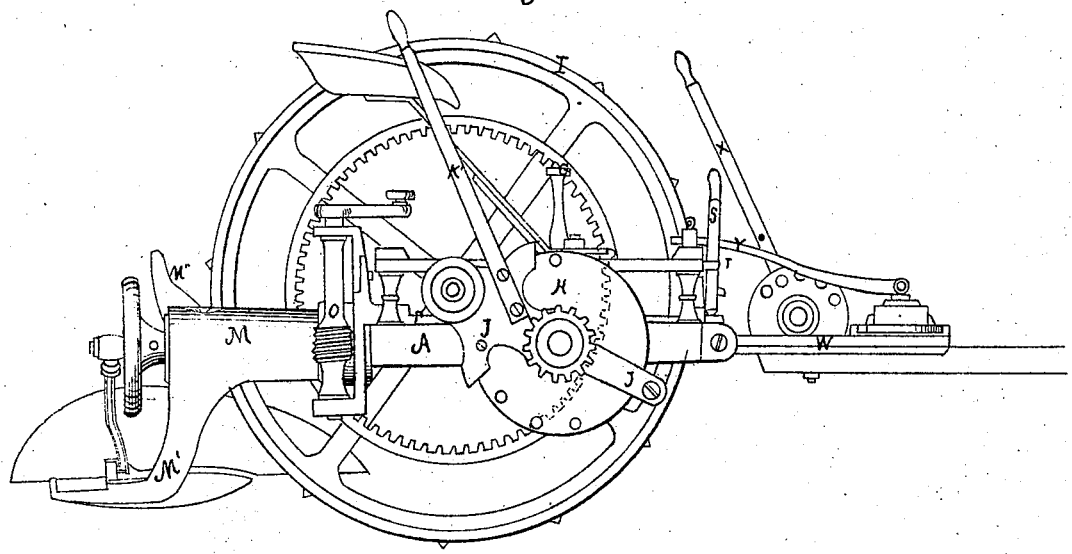

Figure 1 is a plan view of my machine, with the driver's foot-board and seat removed. Fig. 2 is an elevation of the outer side of the machine, the bearing-wheel on that side being removed. Fig. 3 is a rear elevation of my machine. Fig. 4 is a horizontal section of the coupling-arm and the axis upon which it moves, showing also the position and connection of the cutter's crank-shaft. Fig. 5 is a front elevation of the frame and driver's foot-board, showing the lever which throws the lifting-screw in and out of gear.

The machine presented in this application is a combined reaper and mower, and my application is made in two divisions, to cover by separate patents the construction of frame and attachments, and the construction and operation of rake, reel, and platform with attachments.

My invention, as presented in this application, consists, first, in the construction and arrangement of parts of the main frame; second, in construction and arrangement of the sector-plates and coupling-arms, whereby great strength and stiffness are obtained without increase of size and weight; third, in construction and arrangement of the coupling-arm which connects the cutting apparatus to the main frame; fourth, in the devices for raising, lowering, and controlling the cutting apparatus.

That others may understand my invention, I will particularly describe it.

The main frame A, I cast in one piece. It is rectangular in form and Γ-shaped in section. At proper points on each side are formed cylindrical boxes, as shown in Fig. 1, into the cavities of which the hubs of the circular plates H H are fitted. The pinion-shaft B passes through the centers of the hubs of the plates H, having its bearings therein. By this mode of attaching the plates H to the main frame it will be perceived the utmost strength and security will be attained, for every tendency to displacement will be resisted by the solid frame of the machine surrounding the hub of the plate H, and the only use for bolts will be to keep the plate H in place and to prevent it from turning on its axis. The bearings of the pinion-shaft being in the center of the plate H, and not otherwise connected to the main frame, must always be constant in relative position.

The driving bevel-gear C is placed loosely upon the axle B, and is made to revolve with said axle by slipping over the clutch-pin D, which is rigidly fixed in the shaft. The gear-wheel C is controlled by the clutch-lever E, which moves it to or from the clutch-pin, and at the same time in or out of mesh with the crank-shaft pinion F, so that when the gear-wheel C is loose upon the shaft B it is also free from its pinion F. The stop-link G, Figs. 1 and 3, retains the gear-wheel C in either position, as desired.

The edges of the circular plates H H extend beyond those portions which are in contact with the main frame, so as to form a flange or rim, as shown in Figs. 1 and 3. The shaft B projects beyond the main frame and the plates H H, and has upon each of its ends a pinion with proper clutch-gear, said pinions meshing with the gear-rims of the bearing-wheels I I.

Upon the face of each of the plates H H is the coupling-arm J, which is a straight bar or plate with a cross-head and a hole for the passage of the pinion-shaft. The two ends of the cross-head and one end of the plate are made to embrace and clasp over the edge of the plate H, as shown in Figs. 1 and 3. The coupling-arm J will then revolve around the center of the pinion-shaft B, but not upon said shaft as an axis. That end of the arm J toward the cross-head is extended somewhat beyond the edge of the plate H, and upon this extended end is placed the axle of the bearing-wheel I, which may then rise and fall in the arc of a circle, of which the axis of the shaft B, with the pinions at its ends, is the center, and so that said pinions and the cog-rims of the bearing-wheels will never be out of mesh whatever may be the position of the bearing-wheel in respect to the shaft B and its pinions.

The arm J is retained in any desired position by a pin inserted through it and into one of a series of holes provided for the purpose. The levers K' K' are secured to the arms J, to facilitate the raising and lowering of the axles of the bearing-wheels in respect to the main frame.

At the rear end of the main frame A is the stout horizontal stud or axle K, Fig. 4. This stud is cast solid with the frame A, and is cored out so as to form a tubular box for the cutter's crank-shaft L. The outer surface of the stud K is tapering and made true, so as to form an axial bearing for the coupling-arm M, by which the cutting apparatus is connected to the main frame. The coupling-arm M consists of a stout hub which is secured upon the axle-stud K and two lateral arms, M' M''. The arm M' extends from the rear end of the hub downward, curving at the same time toward the cutting apparatus and backward so as to bring its broad surface horizontal. It may be strengthened by ribs if necessary. The end of M' is extended horizontally sufficiently far to afford a secure attachment for the finger-bar of the cutting apparatus.

The arm M'' projects from the upper part of the rear end of the hub, laterally toward the cutting apparatus, its broad side being about vertical and its direction slightly inclined upward. To its outer end is attached the bearing for the reel-shaft and its accompanying devices, as will be fully explained in the other division of this application.

It is required in every machine having a flexible cutting apparatus that it should be under the control of the attendant, so that he can raise it from the ground either wholly or one end only, at will, and it is also desirable that it should be within the power of the attendant to render its connection with the main frame rigid. These conditions I accomplish in the following manner: Around the base of the hub M is the worm-gear N, and meshing with it the worm-screw O, operated by a crank, as shown in Figs. 1, 2, and 3. When the worm-screw O is in mesh with the worm-gear N, then the outer end of the cutting apparatus can be raised or lowered and held rigidly at any point; and when it is not in mesh with the worm-gear N, then the outer end of the cutting apparatus may rise and fall with the undulations of the ground over which it is drawn. The worm-screw M may be thrown in or out of gear by the lever P, upon the rear end of which it is mounted. The lever P is pivoted to the main frame A at R, and is operated by the hand-lever S, or its equivalent, which is provided with a stop-pin, T, Fig. 5, by which it is retained in the position to bring the worm-screw in gear or out of gear, as desired.

The hook U, bolted to the main frame and projecting behind the flange V, which is upon the base of the hub of M, as shown in Fig. 1, prevents the coupling-arm M from slipping from its axial stud K.

At the front of the machine is the flexible tongue W, the vertical position of which in regard to the main frame A is controlled by the attendant, and changed at will by means of the lever X. By depressing the rear end of this tongue the front end of the main frame is also depressed, and the rear end of the same, together with the cutting apparatus, is raised. They may be retained in this position by a pin inserted through one of the holes in the strap Y into the front edge of the driver's foot-board, as shown in Fig. 2. By this means, when mowing, the inner end of the cutting apparatus may be raised to pass clear of any obstruction without raising the other end of said apparatus from the ground; and when reaping, the inner end may be permanently retained at the desired height, while the outer end may be supported as is common upon a grain-wheel.

The worm-screw Z, near the rear end of the crank-shaft L, is intended to drive the reel and automatic rake, when such are used. It forms no part of the invention as included in this application.

Having described my invention, what I claim as new, and desire to secure by Letters Patent, is—

1. The coupling-arm J, in combination with the circular plate H, substantially as and for the purpose set forth.

2. The coupling-arm J, constructed to clasp the sector-plate H at three points so as not to depend upon the pinion-shaft for its center of motion.

3. The coupling-arm M, mounted and moving upon the horizontal, hollow, axial stud K, through which passes the cutter's crank-shaft, substantially as and for the purpose set forth.

4. The hook U, in combination with the flange V on the hub of M, substantially as and for the purpose set forth.

WILLIAM M. WHITELEY, Jr.

Witnesses:
S. D. CARPENTER,
GEO. ARTHUR.